United States Patent
Osterland et al.

(10) Patent No.: US 7,096,638 B2
(45) Date of Patent: *Aug. 29, 2006

(54) LOW INSERTION EFFORT U-BASE RETAINER

(75) Inventors: Robert W. Osterland, East China Township, MI (US); Jeff A. Slobodecki, Wales, MI (US); Matthew H. Gibbons, Farmington Hills, MI (US)

(73) Assignee: Newfrey LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/449,647

(22) Filed: May 30, 2003

(65) Prior Publication Data

US 2003/0233738 A1 Dec. 25, 2003

Related U.S. Application Data

(63) Continuation-in-part of application No. PCT/US02/06753, filed on Mar. 4, 2002.

(60) Provisional application No. 60/272,992, filed on Mar. 2, 2001.

(51) Int. Cl.
*F16B 5/06* (2006.01)

(52) U.S. Cl. ............... 52/708; 52/716.4; 52/716.7; 24/295

(58) Field of Classification Search ............. 52/708, 52/716.4, 716.6, 716.7; 24/293, 294, 295
See application file for complete search history.

(56) References Cited

U.S. PATENT DOCUMENTS

| 2,096,648 | A | 10/1937 | Place |
|---|---|---|---|
| 2,590,264 | A | 3/1952 | Meyers et al. |
| 2,848,768 | A | 8/1958 | Taylor |
| 2,849,765 | A | 9/1958 | DeSena |
| 2,946,612 | A | 7/1960 | Ahlgren |
| 3,038,747 | A | 6/1962 | Rapata |
| 3,208,122 | A | 9/1965 | Holton |
| 3,310,929 | A | 3/1967 | Garvey |
| 3,703,120 | A | 11/1972 | VanBuren, Jr. |
| 3,830,134 | A | 8/1974 | Erickson |
| 3,842,565 | A | 10/1974 | Brown et al. |
| 3,869,958 | A | 3/1975 | Murayama |
| 4,245,652 | A | 1/1981 | Kelly et al. |
| 4,271,634 | A | 6/1981 | Andrzejewski |
| 4,324,826 | A | 4/1982 | Ginster |
| 4,356,601 | A | 11/1982 | Kimura |
| 4,399,644 | A | 8/1983 | Bright |
| 4,402,118 | A | 9/1983 | Benedetti |
| 4,470,178 | A | 9/1984 | Matsui |
| 4,497,516 | A | 2/1985 | Morita et al. |

(Continued)

FOREIGN PATENT DOCUMENTS

CA        496700        10/1953

(Continued)

*Primary Examiner*—Basil Katcheves
(74) *Attorney, Agent, or Firm*—Harness, Dickey & Pierce, P.L.C.

(57) ABSTRACT

A resilient clip for engaging a structure and having a body portion 22 with a pair of top flanges 24, a pair of fastening fingers 26 and a pair of abutting coupling flanges 28. Each of the fastening fingers 26 are coupled to the body portion 22 that is coupled to an associated top flange 24. Each of the abutting flanges 26 has a concave surface, which engages the mounting structure. The fastening finger 26 portions are configured to engage a first side of a mounting flange on an interior trim component. An optional sealing member 122 may be used to provide sealing engagement.

19 Claims, 14 Drawing Sheets

U.S. PATENT DOCUMENTS

| | | | |
|---|---|---|---|
| 4,630,338 A | 12/1986 | Osterland et al. | |
| 4,644,612 A | 2/1987 | Osterland | |
| 4,765,036 A | 8/1988 | Iguchi et al. | |
| 4,778,320 A | 10/1988 | Nakama | |
| 4,780,037 A | 10/1988 | Payne | |
| 4,792,475 A | 12/1988 | Bien | |
| 4,861,208 A | 8/1989 | Boundy | |
| 4,865,505 A * | 9/1989 | Okada | 411/512 |
| 4,927,306 A | 5/1990 | Sato | |
| 5,028,190 A | 7/1991 | Loughlin, Jr. et al. | |
| 5,106,223 A | 4/1992 | Kraus | |
| 5,129,768 A | 7/1992 | Hoyle et al. | |
| 5,173,026 A | 12/1992 | Cordola et al. | |
| 5,193,961 A | 3/1993 | Hoyle et al. | |
| 5,261,650 A | 11/1993 | Hein | |
| 5,296,068 A | 3/1994 | Turner | |
| 5,297,322 A | 3/1994 | Kraus | |
| 5,360,304 A | 11/1994 | Notaro et al. | |
| 5,367,751 A | 11/1994 | DeWitt | |
| 5,399,045 A | 3/1995 | Yoneda et al. | |
| 5,419,606 A | 5/1995 | Hull et al. | |
| 5,448,809 A | 9/1995 | Kraus | |
| 5,484,221 A | 1/1996 | DeCoux | |
| 5,494,391 A | 2/1996 | Zhou | |
| 5,533,237 A | 7/1996 | Higgins | |
| 5,542,158 A * | 8/1996 | Gronau et al. | 24/295 |
| 5,561,961 A | 10/1996 | Paul | |
| 5,567,082 A | 10/1996 | Ball et al. | |
| 5,671,513 A | 9/1997 | Kawahara et al. | |
| 5,704,753 A | 1/1998 | Ueno | |
| 5,725,343 A | 3/1998 | Smith | |
| 5,738,476 A | 4/1998 | Assimakopoulos | |
| 5,758,987 A | 6/1998 | Frame et al. | |
| 5,774,949 A | 7/1998 | Cornell et al. | |
| 5,775,861 A | 7/1998 | Leon et al. | |
| 5,797,714 A | 8/1998 | Oddenino | |
| 5,829,934 A | 11/1998 | Danby et al. | |
| 5,871,320 A | 2/1999 | Kovac | |
| 6,074,150 A | 6/2000 | Shinozaki et al. | |
| 6,141,837 A * | 11/2000 | Wisniewski | 24/295 |
| 6,154,933 A | 12/2000 | Vetter et al. | |
| 6,209,178 B1 | 4/2001 | Wiese et al. | |
| 6,244,805 B1 | 6/2001 | Everard | |
| 6,315,510 B1 | 11/2001 | Sturies et al. | |
| 6,353,981 B1 * | 3/2002 | Smith | 24/295 |
| 6,381,811 B1 * | 5/2002 | Smith et al. | 24/289 |
| 6,497,011 B1 * | 12/2002 | Smith et al. | 24/295 |
| 6,527,471 B1 | 3/2003 | Smith et al. | |
| 6,648,542 B1 * | 11/2003 | Smith et al. | 403/291 |
| 6,691,380 B1 * | 2/2004 | Vassiliou | 24/295 |
| 6,718,599 B1 * | 4/2004 | Dickinson et al. | 24/295 |
| 2002/0001502 A1 | 1/2002 | Smith et al. | |
| 2002/0017009 A1 | 2/2002 | Smith et al. | |
| 2002/0104201 A1 | 8/2002 | Smith et al. | |
| 2002/0194710 A1 | 12/2002 | Dickinson et al. | |
| 2003/0024077 A1 | 2/2003 | Vassiliou | |
| 2003/0024078 A1 | 2/2003 | Vassiliou | |

FOREIGN PATENT DOCUMENTS

| | | |
|---|---|---|
| EP | 0855523 A1 | 7/1998 |
| GB | 884123 | 12/1961 |
| JP | 07-293521 | 7/1995 |
| JP | 08-121441 | 5/1996 |

* cited by examiner

SECTION A A

SECTION B B

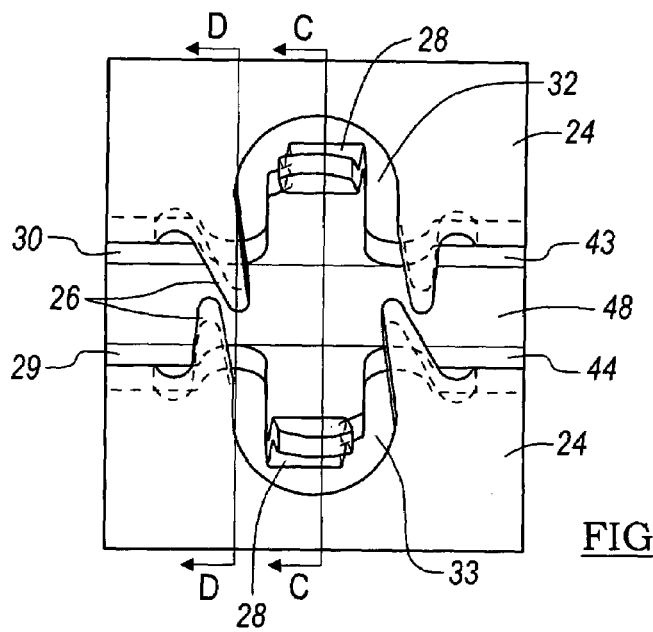
FIG. 5A
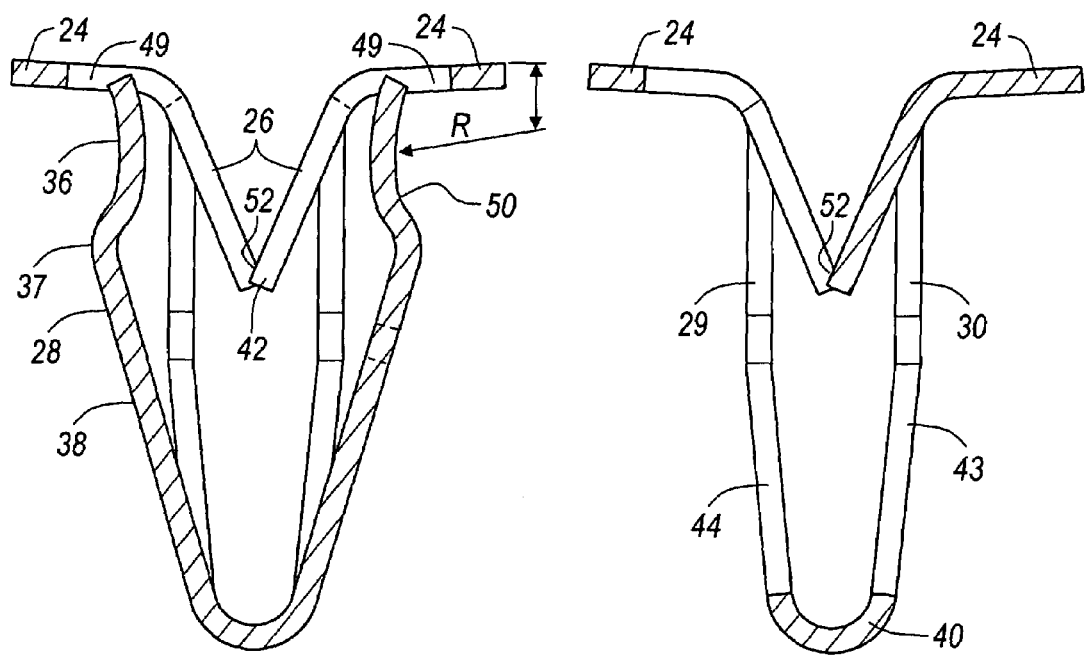
FIG. 5B
SECTION C C
FIG. 5C
SECTION D D

SECTION A A

SECTION B B

SECTION C C

SECTION D D

LOW INSERTION EFFORT U-BASE RETAINER

CROSS-REFERENCE TO RELATED APPLICATIONS

This application is a continuation-in-part application of pending PCT International Application PCT/US02/06753 which was filed in the U.S. Receiving Office on Mar. 4, 2002 and published on Sep. 12, 2002 as WO 02/070905 A2. PCT International Application PCT/US02/06753 claims the benefit of U.S. Provisional Application No. 60/272,992, filed on Mar. 2, 2001. The disclosures of the above applications are incorporated herein by reference.

TECHNICAL FIELD

The present invention relates generally to resilient clip fasteners and, more particularly, to a resilient clip fastener that employs a particular surface geometry to secure the body portion of the resilient clip to a structure. More specifically, the present invention relates to a resilient clip fastener having a construction that utilizes abutment flanges to permit the clip to be inserted into an aperture with a relatively low insertion force while resisting relatively high withdrawal forces. The invention also relates to a resilient clip fastener having a construction that accounts in several manners for part-to-part variation between the structures that are to be fastened together.

BACKGROUND OF THE INVENTION

Many current vehicles employ resilient clips to secure various components to the vehicle body. One such application concerns interior panels that mount to the interior of the vehicle such as on the doors. Such panels serve not only to provide occupants with a convenient point to grasp during ingress to and egress from the vehicle, but also provide energy absorption during a crash event.

During assembly of the vehicle, it is conventional procedure of the entire panel assembly to be installed onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal.

Additionally, U-based (or V-based) fasteners are often used for interior coupling of parts, however they are rarely used on the exterior due to the lack of sealing of the fastener. Accordingly, it is often desired to provide a sealing engagement between the panel fastener and the panel and/or sheet metal. Previous attempts to provide such sealing engagement included pouring sealing material around the panel fastener. However, this disadvantageously increased the stiffness of the panel fastener and therefore decreases the performance (i.e. durability and/or fastening retention capability).

Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners. Still further, the fastener should permit proper sealing engagement between the fastener and the panel and/or sheet metal.

SUMMARY OF THE INVENTION

In one preferred form, the present invention provides a resilient clip for engaging a structure. The resilient clip includes a body portion having a pair of top flanges, a pair of fastening members and a pair of abutting flanges. Each of the fastening members has a base portion that is coupled to an associated top flange. Each of the abutting flanges has a concave surface that engages the mounting structure. A sealing member is disposed about the top of the resilient clip to provide sealing engagement with at least a portion of the structure.

BRIEF DESCRIPTION OF THE DRAWINGS

Additional advantages and features of the present invention will become apparent from the subsequent description and the appended claims, taken in conjunction with the accompanying drawings, wherein:

FIGS. 3b and 3c depict cross-sectional views of the fastener depicted in FIG. 3a;

FIGS. 5b and 5c depict cross-sectional views of the fastener depicted in FIG. 5a;

FIGS. 14b and 14c depict cross-sectional views of the fastener depicted in FIG. 14a;

FIG. 15a is a top view of a portion of the fastener of FIG. 12;

FIGS. 15b and 15c depict cross-sectional views of the fastener depicted in FIG. 15a;

DETAILED DESCRIPTION OF THE PREFERRED EMBODIMENT

Figure 1:
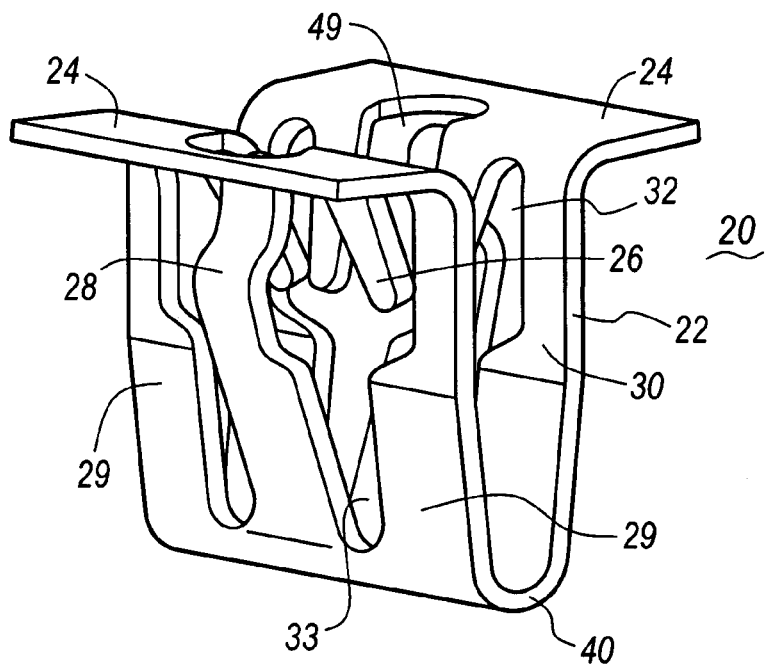
FIG. 1 is a perspective view of a fastener constructed in accordance with the teachings of the present invention.
Figure 2:
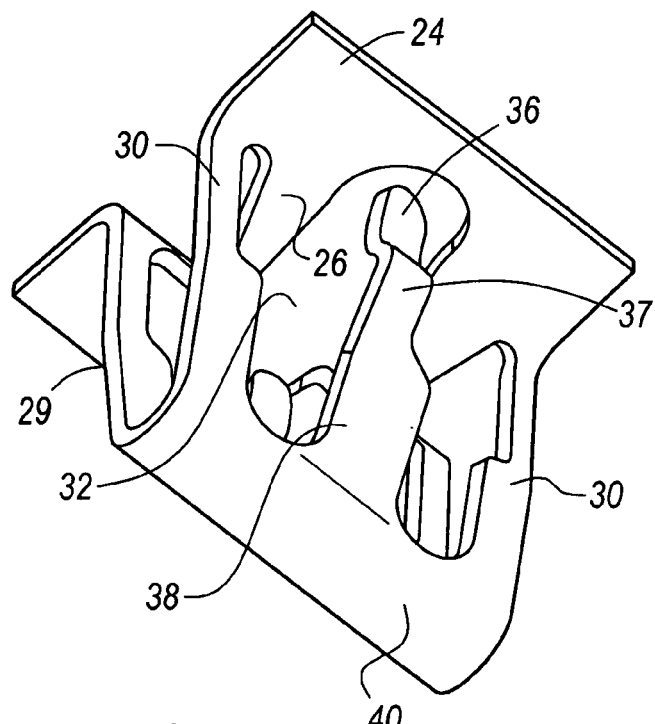
FIG. 2 is a lower perspective view of the fastener of FIG. 1.

The following description of the preferred embodiments is merely exemplary in nature and is in no way intended to limit the invention, its application, or uses.

Referring to FIGS. 1 through 8, a generally U-shaped fastener 20 in accordance with the present invention is disclosed. The generally U-shaped fastener 20 is defined by a body portion 22 and a pair of top flanges 24. Integral with the top flanges 24 are two pair of finger members 26 which are used to couple the generally U-shaped fastener 20 to a mounting flange (shown in FIG. 11). Additionally, the body portion 22 has a pair of abutting flanges 28 which generally lie outside side members 29 and 30 of the body portion 22. The side members, which are coupled by a bottom curved member 29 and 30, define a pair of apertures 32 and 33, which allow for the inward compression of the abutting flanges 28.

Generally, the abutting flanges 28 are defined by three portions. The first portion 36 is defined by an exterior concave engaging surface 50. The second portion 37, which acts as a transition to the third portion 38, is defined by a convex surface. The third portion 38 functions to couple the abutting flange 28 to the base portion 40 of the body 22 of the generally U-shaped fastener 20.

Figure 3A:
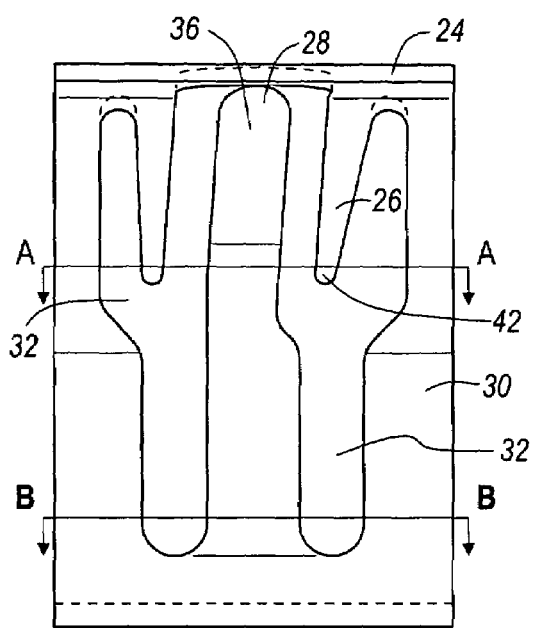
FIG. 3a is a side view of the fastener of FIG. 1 illustrating the spacing of the structures in greater detail.
Figure 4:
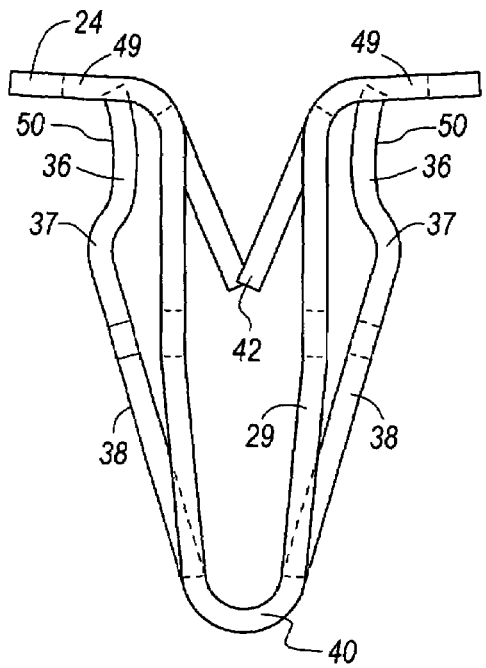
FIG. 4 is a side view of the fastener constructed in accordance with the teachings of a first preferred embodiment of the present invention.
Figure 3B:
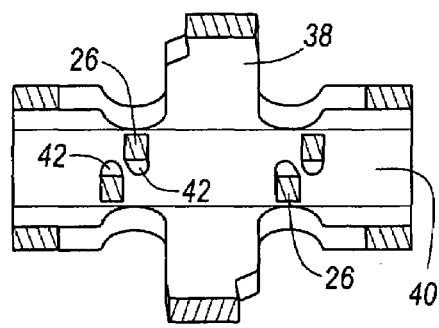
Figure 3C:
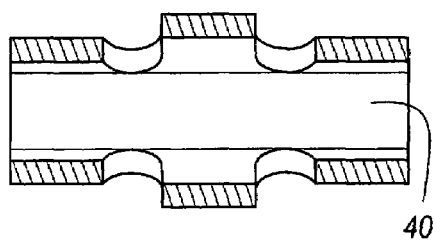

FIG. 3a depicts a side view of the generally U-shaped fastener 20 of the current invention. Shown is the relationship of the finger members 26 to the abutting flanges 28, which are formed within the aperture 32. As best seen in FIGS. 3b and 4, the tips 42 of the finger members 26 are angled to frictionally engage a flange member 54 of a trim component 60. FIG. 3b shows the relationship of the third portion 38 to the base member 40 of the body portion 22.

FIG. 4 is a side view of the U-shaped fastener 20 and shows the relationship of the abutting flanges 28 to the body portion 22. As can be seen, the top flanges 24 defines an upper keyhole slot 46 which allow the movement of the abutting flanges 28 when they are compressed. Further depicted is the angular relationship of the side members 29 and 30 of the body portion with respect to the base 40 and the top flanges 24. It must be noted that while the finger member 26 are shown, any suitable fastener is usable. This includes but is not limited to a hole, threaded hole, slots or flanges.

Figure 5A:
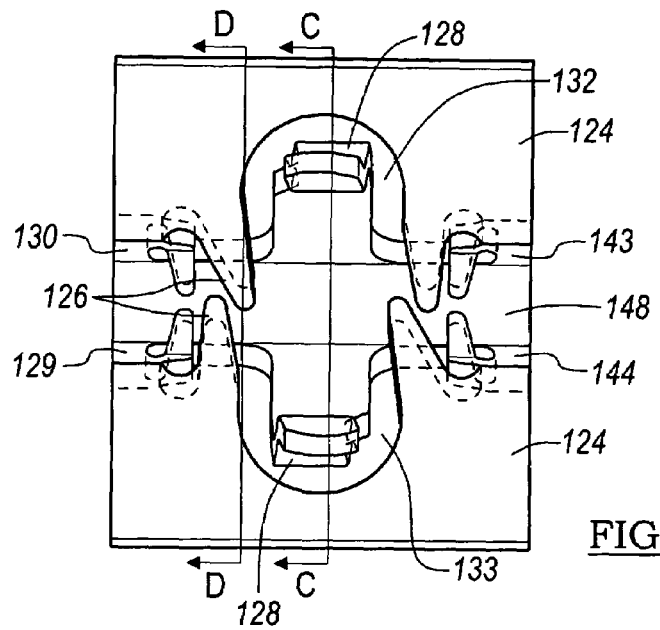
FIG. 5a is a top view of a portion of the fastener of FIG. 1 illustrating the clip structure in greater detail.

FIG. 5a depicts a top view of the generally U-shaped fastener 20. Defined by the side members 29 and 30 is a slot 48 which is used to engage the coupling flange 54 (see FIGS. 9 and 11) of a trim component 60. The exterior concave surface 50 of the abutting flanges 28 are used to engage sheet metal to hold the fastener in place. Also depicted is the interior surface 52 of the finger members 26, which engage the surfaces of the coupling flange 54.

FIG. 5b is a cross-section of the fastener as shown in FIG. 5a. Depicted is the relationship of the abutting flanges 28 with the base member 40. Further, the cross-section details the radius of the exterior concave surface 50. The radius of the concave surface 50 generally can be between 3.5 to 6.0 millimeters and preferably 4.75 millimeters. The center of curvature for the radius R is between 2 and 4 millimeters from the top of the fastener and preferably 2.3 millimeters. FIG. 5c best details the relationship of the finger members 26 to the top flanges 24 and the first and second flange members 43 and 44.

Figure 6:
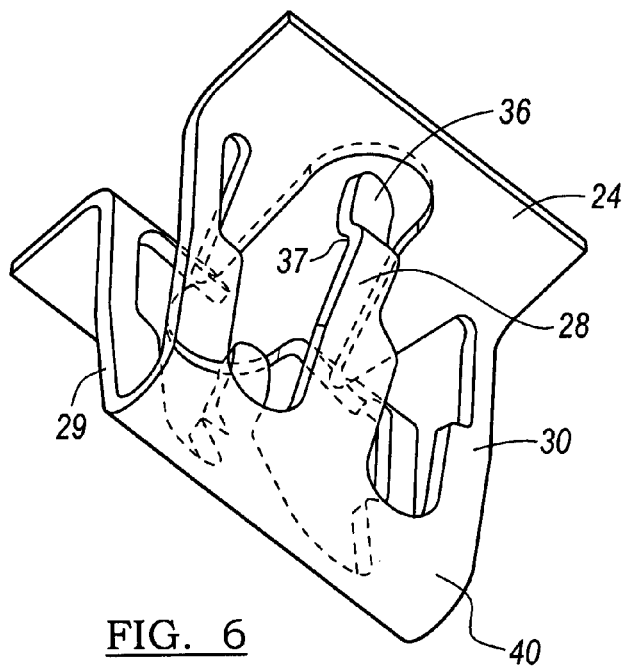
FIG. 6 is a lower perspective view of the fastener of FIG. 1 with portions shown hidden.
Figure 7:
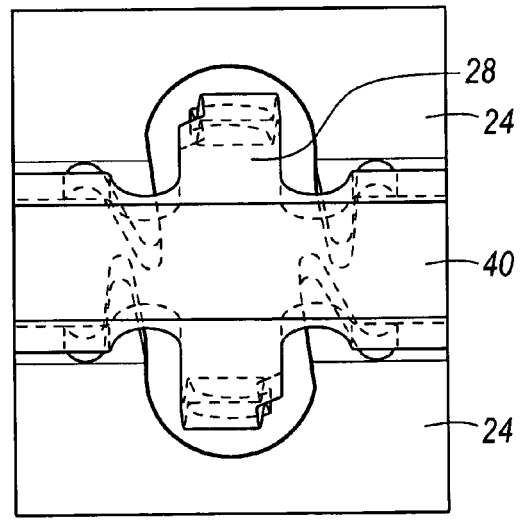
FIG. 7 is a bottom view of the fastener of FIG. 1 with portions shown hidden.
Figure 8:
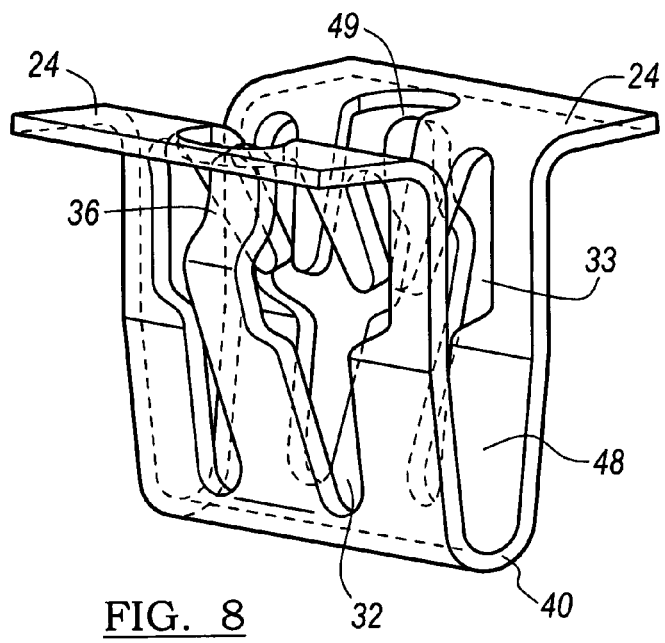
FIG. 8 is a perspective view of the fastener of FIG. 1 with portions shown hidden.

FIGS. 6 through 8 are depictions of the U-shaped fastener 20 of the current invention with hidden components shown in phantom. Depicted is the relationship of the fastener components with various surfaces of the fastener.

Figure 9:
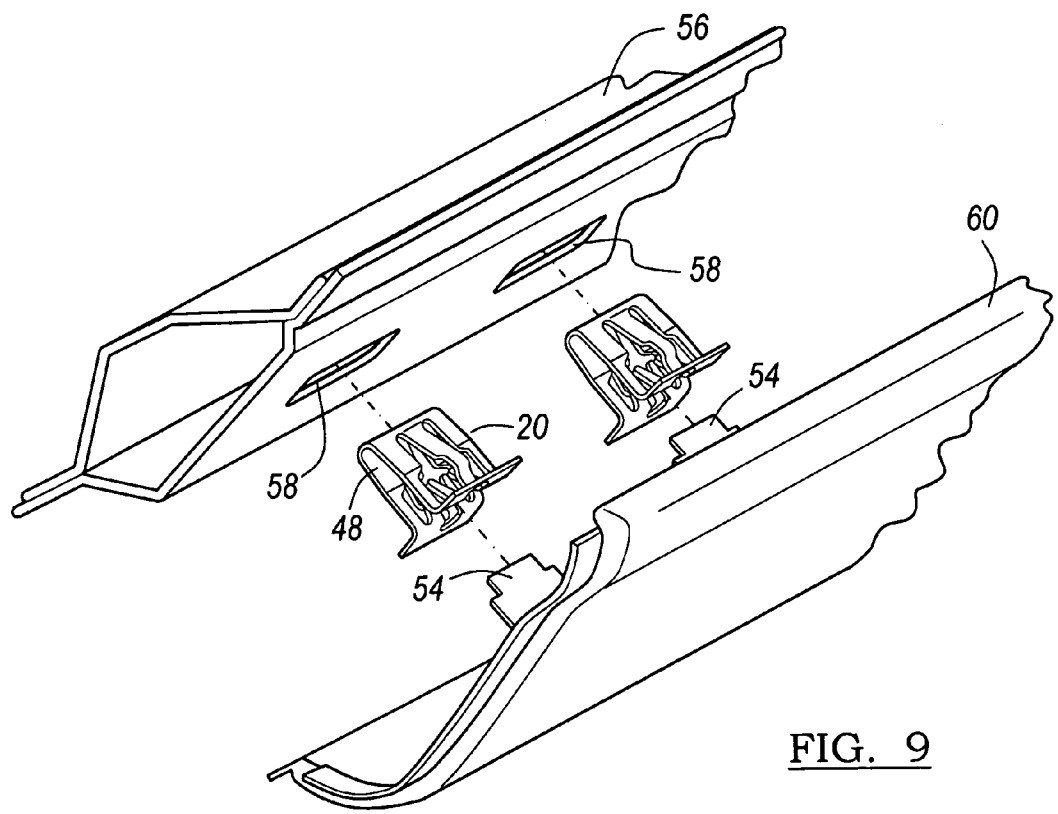
FIG. 9 is an exploded perspective view showing the fastener being used to mount an interior trim component.

FIG. 9 depicts the use of the U-shaped fastener 20 of the current invention. Shown is a sheet metal structure 56, which defines a pair of apertures 58. The apertures 58 are designed to accept the U-shaped fastener 20 to allow for the mating of a trim component 60 to the sheet metal 56. The trim component 60 has a pair of flanges 54, which are inserted, into the slot 48 of the U-shaped fastener 20.

Figure 10A:
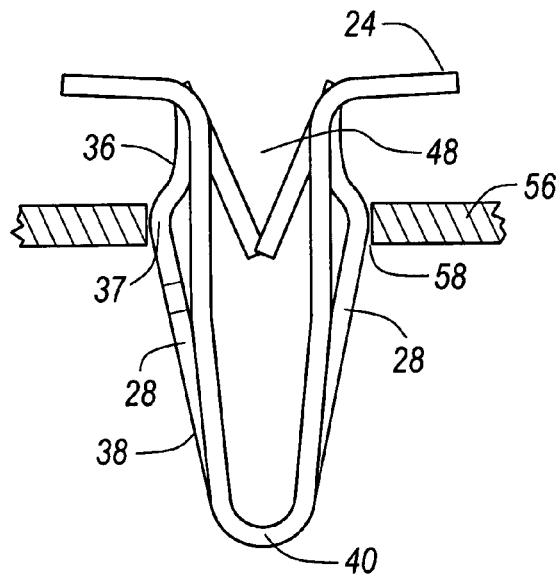
FIGS. 10a and 10b depict cross-sectional views showing the insertion of the fastener.
Figure 10B:
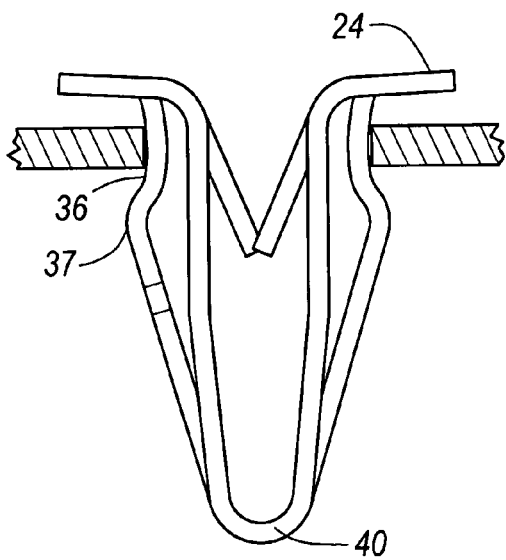

As best seen in FIG. 10, the U-shaped fastener 20 is inserted into the aperture 58 of the sheet metal structure 56. As the fastener 20 is depressed into the aperture 58, the abutting flanges 28 are compressed toward each other and the centerline of the U-shaped fastener 20. This compression of the abutting flanges 28 continues until the sheet metal 56 of the aperture 58 reaches the second portion 37 of the abutting flanges. At this point, a transition occurs and the sheet metal 56 is allowed to engage with the concave surface 50 of the first portion 36 of the abutting flanges 28.

Figure 11:
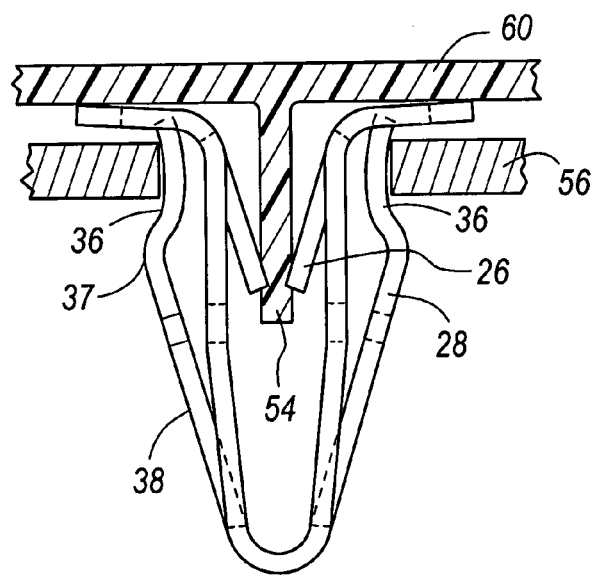
FIG. 11 is a cross-sectional view of the fastener with a corresponding trim component.
Figure 12:
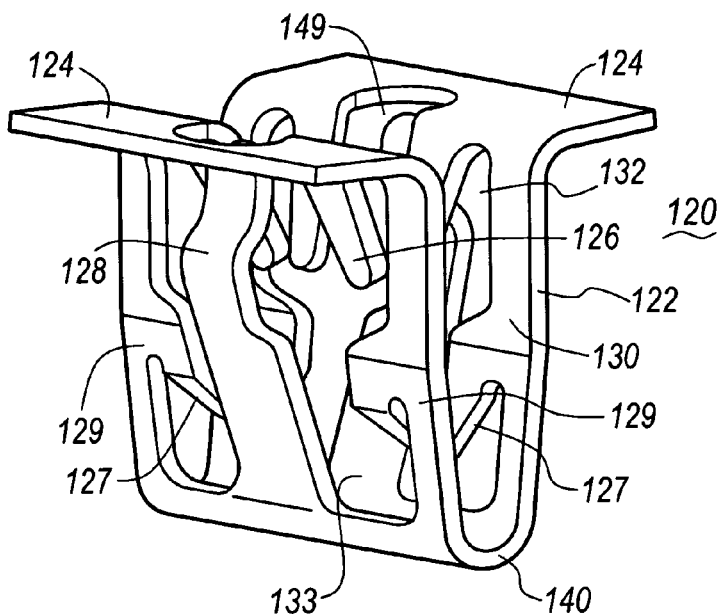
FIG. 12 is a perspective view of a fastener constructed in accordance with the teachings of a second embodiment of the present invention.
Figure 13:
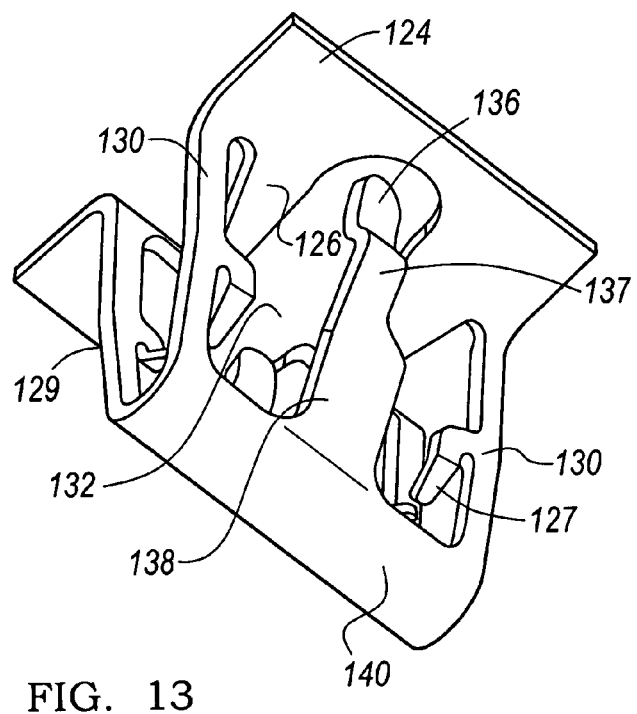
FIG. 13 is a lower perspective view of the fastener of FIG. 12.

FIG. 11 depicts the coupling of the trim component 60 to the U-shaped fastener 20. Shown is the coupling flange 54 inserted between the finger members 26 of the U-shaped fastener 20.

It has been shown that the current fastener 20 is significantly more easy to insert into a sheet metal structure 56 than it is to remove. For example, the fastener as depicted has a required insertion force of about 10 pounds and a removal force of greater than 20 pounds.

Referring to FIGS. 12 through 20, a generally U-shaped fastener 20 in accordance with a second embodiment of the present invention is disclosed. The generally U-shaped fastener 120 is defined by a body portion 122 and a pair of top flanges 124. Integral with the top flanges 124 are two pair of first finger member 126 and a pair of second finger member 127 which are used to couple the generally U-shaped fastener 120 to a mounting flange (shown in FIG. 20). Additionally, the body portion 122 has a pair of abutting flanges 128 which generally lie outside the side members 129 and 130 of the body portion 122. The side members 129 and 130 define a pair of apertures, 132 and 133, which allow for the inward compression of the abutting flanges 128.

Generally, the abutting flanges 128 are defined by three portions. The first portion 136 is defined by an exterior concave engaging surface 150. The second portion 137, which acts as a transition to the third portion 138, is defined by a convex surface. The third portion 138 functions to couple the abutting flange 128 to the base portion 140 of the body 122 of the generally U-shaped fastener 120.

Figure 14A:
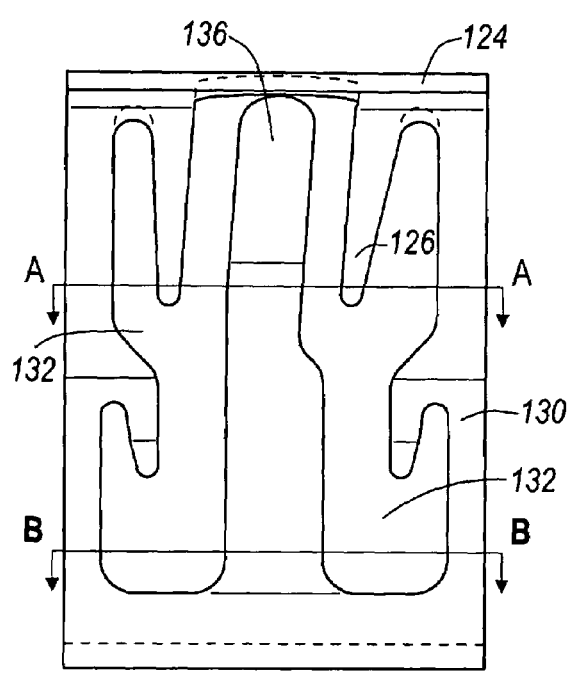
FIG. 14a is a side view of a portion of the fastener of FIG. 12 illustrating the spacing of the structures in greater detail.
Figure 15:
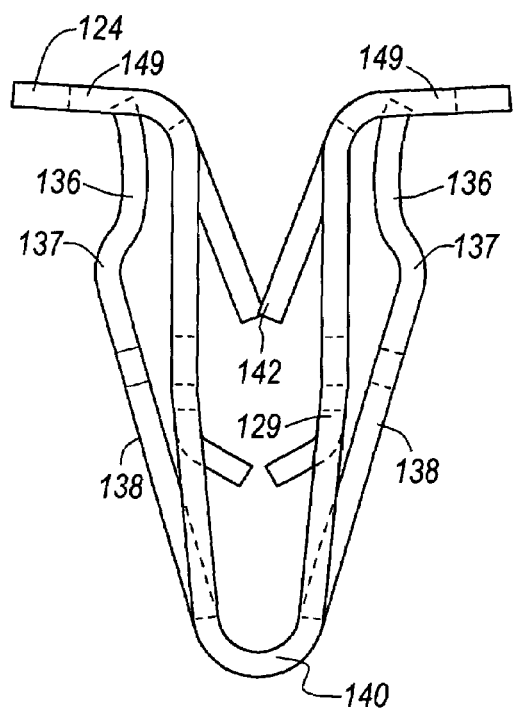
FIG. 15 is a side view of a fastener constructed in accordance with the teachings of the preferred embodiment of the present invention.
Figure 14B:
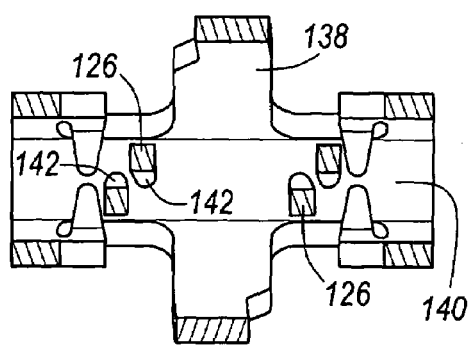
Figure 14C:
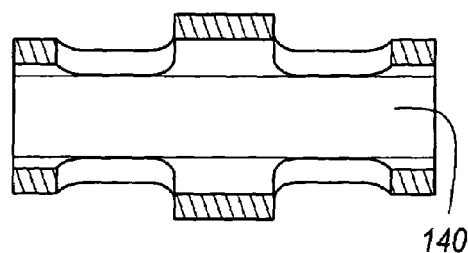

FIG. 14a depicts a side view of the generally U-shaped fastener 120 of the second embodiment of the current invention. Shown is the relationship of the first finger member 126 and second finger member 127 to the abutting flanges 128, which are formed within the aperture 132. As best seen in FIGS. 14b and 15, the tips 142 of the first finger member 126 and the tips 143 of the second finger member 127 are angled to frictionally engage a flange member 154 of a trim component 160. The angle of the first finger member 126 can be between about 15° to 25° and preferably about 20°, while the angle of the second finger member 127 can be between about 50° to 60° and preferably about 55°. FIG. 14b shows the relationship of the third portion 138 to the base member 140 of the body portion 122.

FIG. 15 is a side view of the U-shaped fastener 120 and shows the relationship of the abutting flanges 128 to the body portion 122. As can be seen, the top flanges 124 defines an upper keyhole slot 146 which allow the movement of the abutting flanges 128 when they are compressed. Further depicted is the angular relationship of the side members 129 and 130 of the body portion with respect to the base 140 and the top flanges 124. It must be noted that while the finger members 126 and 127 are shown, any suitable fastener is usable. This includes but is not limited to a hole, threaded hole, slots or flanges.

FIG. 15a depicts a top view of the generally U-shaped fastener 120. Defined by the side members 129 and 130 is a slot 148 which is used to engage the coupling flange 154 (see FIGS. 19 and 21) of a trim component 160. The exterior concave surface 150 of the abutting flanges 128 are used to engage sheet metal to hold the fastener in place. Also depicted is the interior surface 152 of the first and second finger members 126 and 127, which engage the surfaces of the coupling flange 154.

Figure 15B:
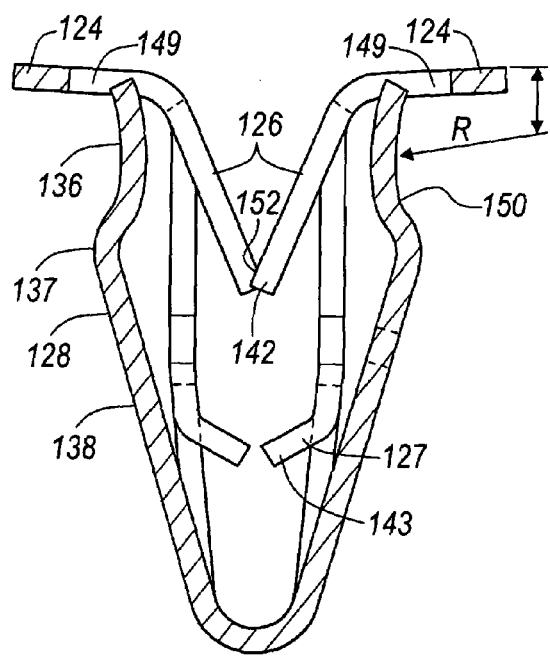
Figure 15C:
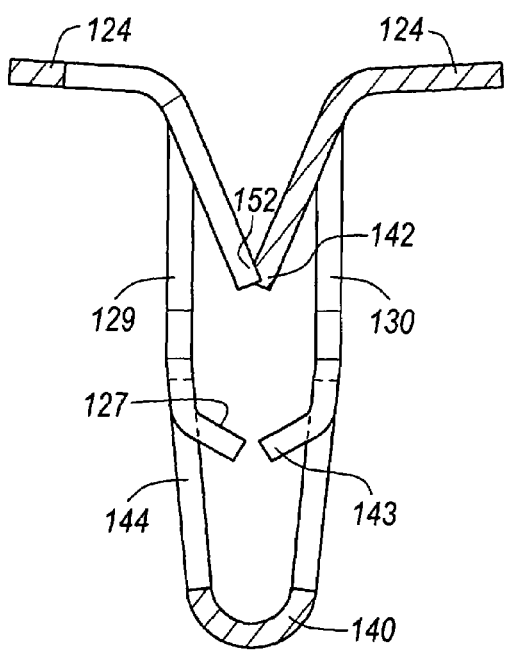

FIG. 15b is a cross-section of the fastener as shown in FIG. 15a. Depicted is the relationship of the abutting flanges 128 with the base member 140. Further, the cross-section details the radius of the exterior concave surface 150. The radius of the concave surface 150 generally can be between 3.5 to 6.0 millimeters and preferably 4.75 millimeters. The center of curvature for the radius R is between 2 and 4 millimeters from the top of the fastener and preferably 2.3 millimeters. FIG. 15c best details the relationship of the first finger member 126 to the top flanges 124 and the first and second flange members 143 and 144.

Figure 16:
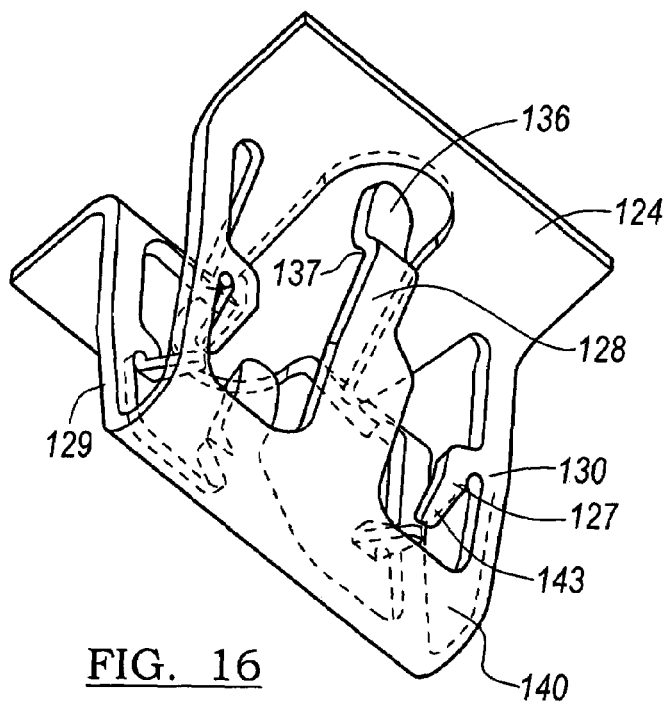
FIG. 16 is a lower perspective view of the fastener of FIG. 12.
Figure 17:
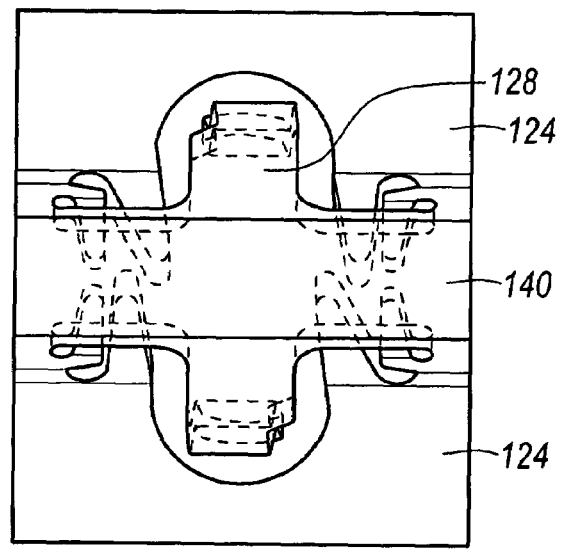
FIG. 17 is a bottom view of the fastener of FIG. 12.
Figure 18:
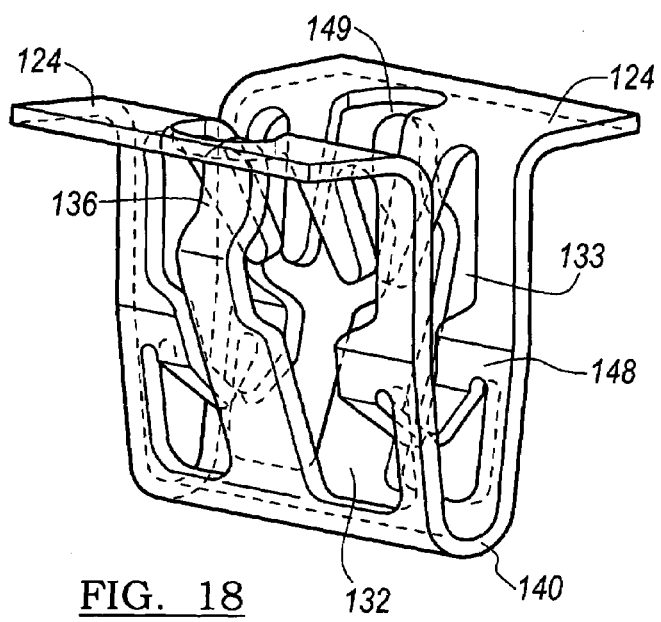
FIG. 18 is a perspective view of the fastener of FIG. 12.

FIGS. 16 through 18 are depictions of the U-shaped fastener 120 of the current invention with hidden components shown in phantom. Depicted is the relationship of the fastener components with various surfaces of the fastener.

Figure 19:
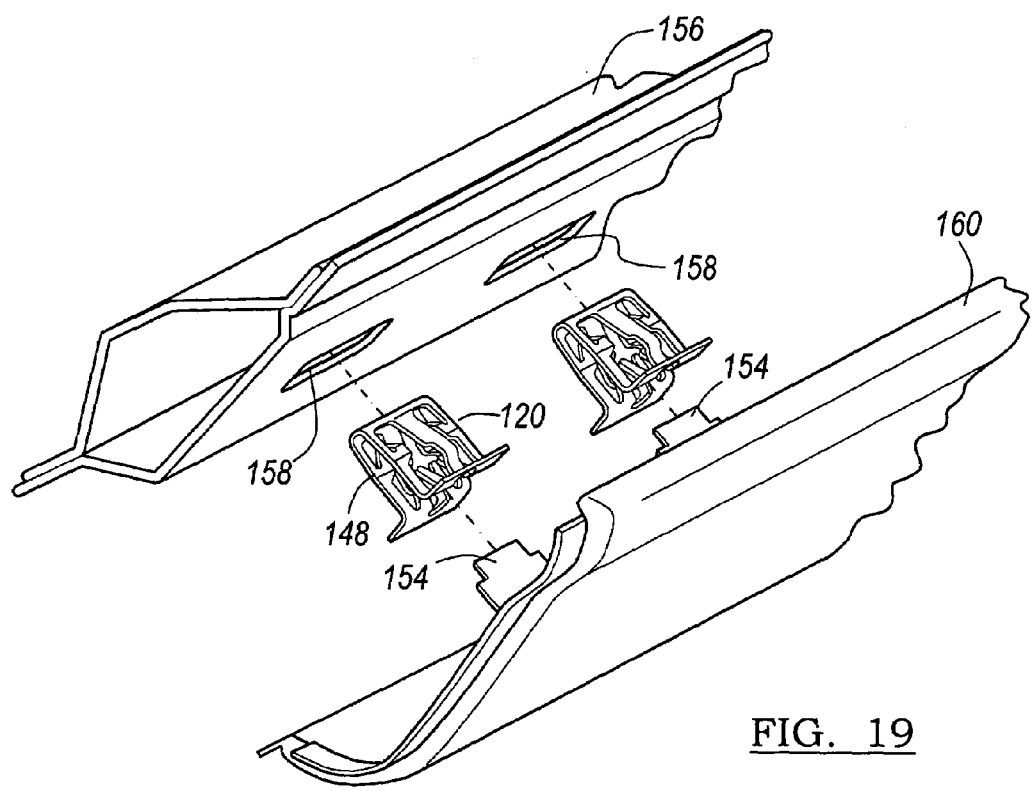
FIG. 19 is an exploded perspective view showing the fastener being used to mount an interior trim component.

FIG. 19 depicts the use of the U-shaped fastener 120 of the current invention. Shown is a sheet metal structure 156, which defines a pair of apertures 158. The apertures 158 are designed to accept the U-shaped fastener 120 to allow for the mating of a trim component 160 to the sheet metal 156. The trim component 160 has a pair of flanges 154, which are inserted, into the slot 148 of the U-shaped fastener 120.

Figure 20A:
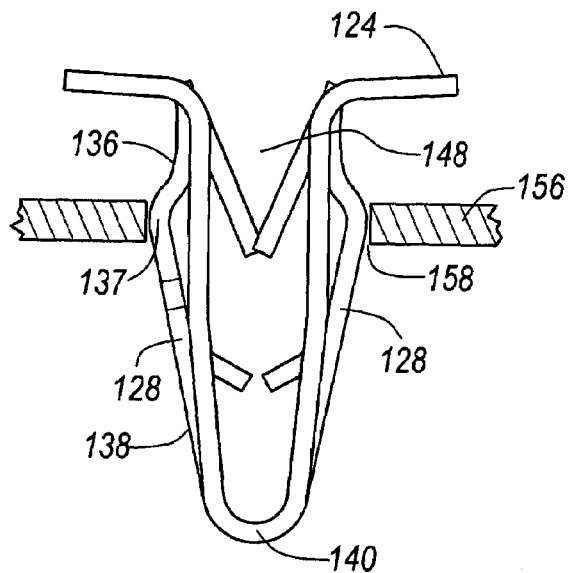
FIGS. 20a and 20b show the insertion of the fastener.
Figure 20B:
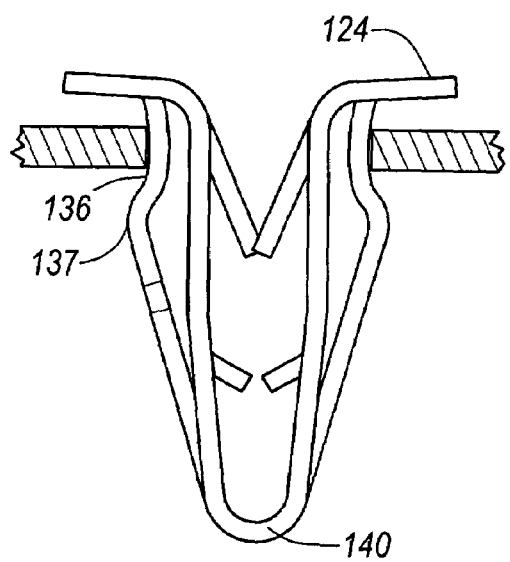

As best seen in FIG. 20, the U-shaped fastener 120 is inserted into the aperture 158 of the sheet metal structure 156. As the fastener 120 is depressed into the aperture 158, the abutting flanges 128 are compressed toward each other and the centerline of the U-shaped fastener 120. This compression of the abutting flanges 128 continues until the sheet metal 156 of the aperture 158 reaches the second portion 137 of the abutting flanges. At this point, a transition occurs and the sheet metal 156 is allowed to engage with the concave surface 156 of the first portion 136 of the abutting flanges 128.

Figure 21:
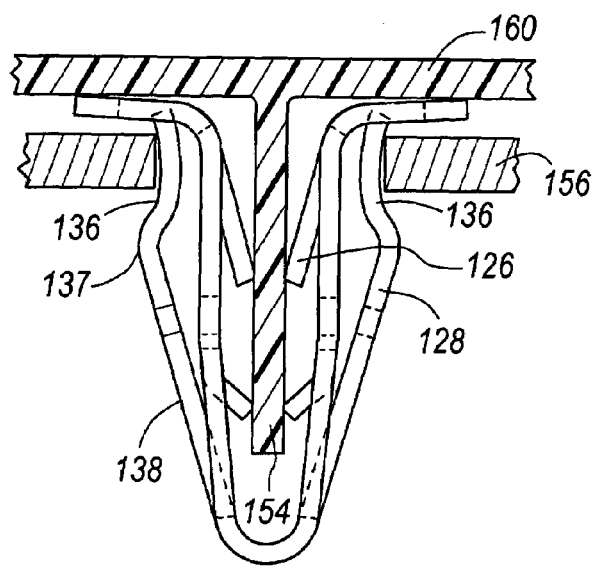
FIG. 21 is a cross-sectional view of the fastener of FIG. 20 with corresponding trim component.

FIG. 21 depicts the coupling of the trim component 160 to the U-shaped fastener 120. Shown is the coupling flange 154 inserted between the first and second finger members 126 and 127 of the U-shaped fastener 120.

It has been shown that the current fastener 120 is significantly more easy to insert into a sheet metal structure 156 than it is to remove. For example, the fastener as depicted has a required insertion force of about 10 pounds and a removal force of greater than 20 pounds.

Referring to FIGS. 22 through 25, a generally U-shaped fastener 120 in accordance with a third embodiment of the present invention is disclosed. The generally U-shaped fastener 120 is similar to the aforementioned fastener 20, therefore, in the interest of brevity, like reference numerals will be uses to denote like features.

Figure 22:
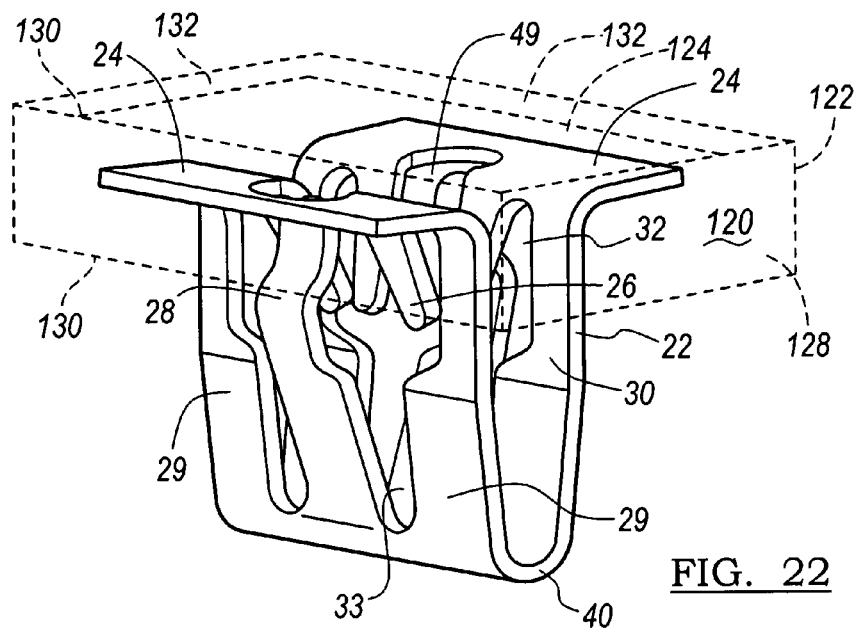
FIG. 22 is a perspective view of a fastener constructed in accordance with the teachings of a third embodiment of the present invention.
Figure 23:
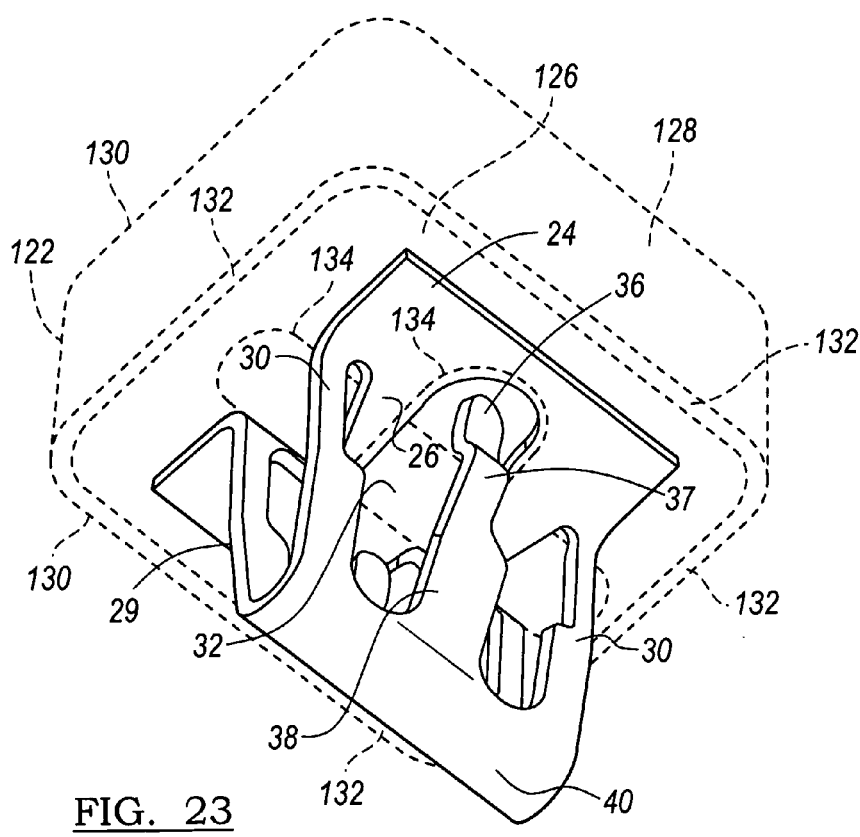
FIG. 23 is a lower perspective view of the fastener of FIG. 22.
Figure 24:
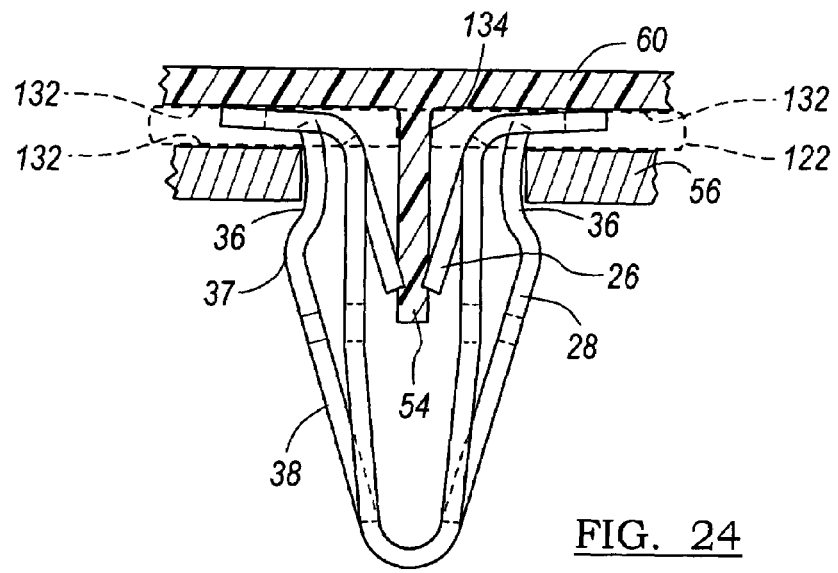
FIG. 24 is a cross-sectional view of the fastener sealingly engaged with a corresponding trim component.
Figure 25:
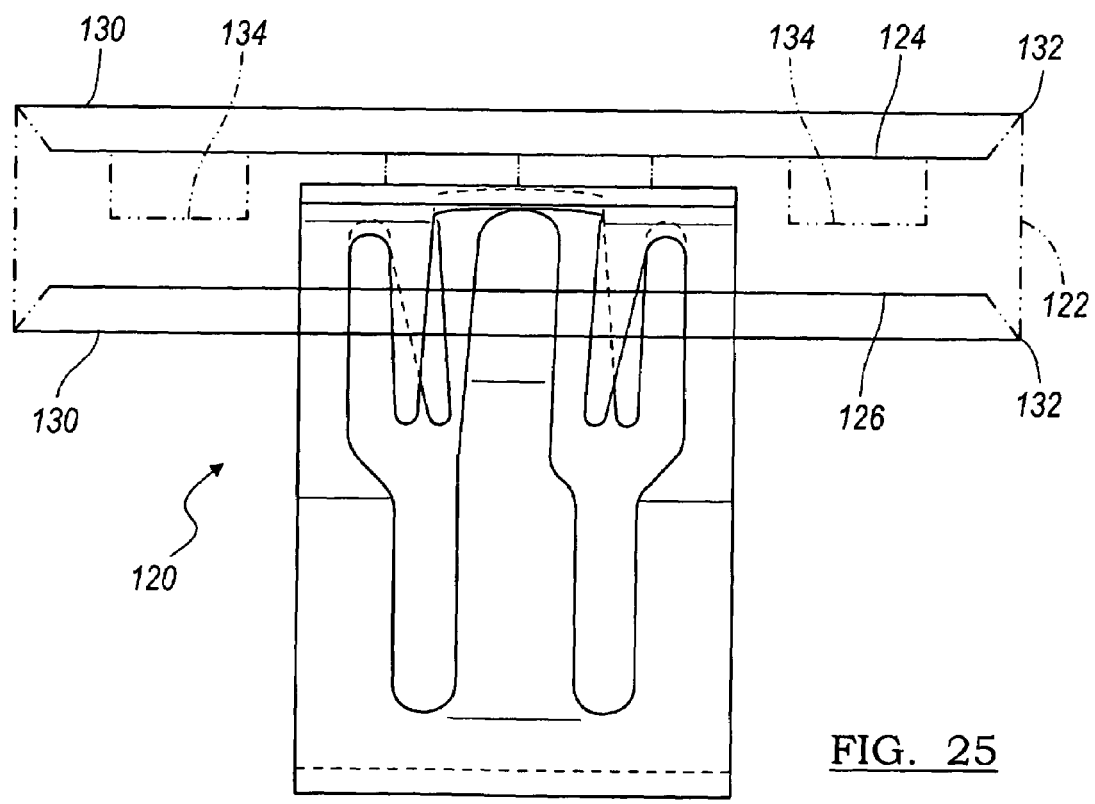
FIG. 25 is a side view illustrating the fastener of FIG. 22 with portions in cross section.

Generally U-shaped fastener 120 further includes an optional sealing member 122, shown in phantom in FIGS. 22 through 24. When fastener 120 is engaged in sheet metal structure 56 and trim component 60, sealing member 122 sealingly engages at least one of sheet metal structure 56 and trim component 60.

In the present embodiment, sealing member 122 is preferably rectangular in shape and is made from a resilient plastic and/or rubber material. However, it should be understood that sealing member 122 may be of any shape or material that is conducive to the instant application.

Preferably, sealing member 122 includes a top surface 124 and a bottom surface 126 interconnected by a plurality of side surfaces 128. Top surface 124 and/or bottom surface 126 is relieved or offset from a peripheral edge portion 130 extending therearound. This relief or offset serves to define a lip section 132 extending around peripheral edge portion 130 that is adapted to engage a surface of sheet metal structure 56 or trim component 60 to provide a sealing engagement. Lip section 132 is generally formed from an upwardly sloping or curved portion extending from top surface 124 or bottom surface 126 to provide a progressively tapered edge. This arrangement permits the progressive engagement and deflection of lip section 132 against the corresponding surface (i.e. sheet metal structure 56 or trim component 60).

Sealing member 122 further includes a plurality of recesses 134 formed therein to permit the free articulation of portions 36, 37, and 38 of each leg and fingers 26. Additionally, at least one of the plurality of recesses 134 is sized to permit the insertion of coupling flange 54 so as to engage finger members 26 as described above and further sized to engage coupling flange 54 to define a sealing engagement therewith.

Sealing member 122 is fabricated by first positioning previously described fastener 20 into a mold (not shown). The mold is shaped to define any desired features, such as lip sections 132, to permit the simply forming of these features or contours in fastener 120.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A generally U-shaped fastener adapted to mount an object to a panel, the panel including a mounting aperture therein, the fastener comprising:
    a body portion having a pair of side members coupled to each other by a curved base portion at an insertion end of the generally U-shaped fastener, the pair of side members defining a slot between the pair of side members, the slot being adapted to receive a coupling member from the object;
    a flange member extending outwardly from each of the pair of side members near an end opposite the insertion end of the generally U-shaped fastener, each flange member being adapted to contact a surrounding portion of the mounting aperture;
    a plurality of finger members extending inwardly into the slot from each of the pair of side members or from the flange members, the plurality of finger members being adapted to grasp the coupling member of the object upon the coupling member being inserted into the slot; and
    at least one abutting flange extending outwardly from each of the pair of side members, each of the at least one abutting flange having a generally straight portion, a transition portion and an engaging portion, the generally straight portion coupling the at least one abutting flange to one of the side members near the insertion end of generally U-shaped fastener, the transition portion being coupled to the generally straight portion and being defined by an exterior convex surface, the engaging portion having an exterior concave surface substantially abutting the exterior convex surface of the transition portion; the engaging portion being adapted to engage an edge of the mounting aperture upon insertion therein to retain the generally U-shaped fastener in the mounting aperture.

2. A generally U-shaped fastener according to claim 1 wherein an exterior surface of the abutting flange member extending from the transition portion to a distal end of the abutting flange consists essentially of the concave engaging surface.

3. A generally U-shaped fastener according to claim 1 wherein the radius of the exterior concave engaging surface is at least about 3.5 millimeters.

4. A generally U-shaped fastener according to claim 3 wherein the center of curvature for the radius is between 2 millimeters and 4 millimeters from the end opposite the insertion end of the generally U-shaped fastener.

5. A generally U-shaped fastener according to claim 1 wherein the force required to insert the generally U-shaped fastener into the mounting aperture to enable the exterior concave engaging surface to engage an edge of the mounting aperture is about 10 pounds.

6. A generally U-shaped fastener according to claim 5 wherein the force required to remove the generally U-shaped fastener from the mounting aperture after the exterior concave engaging surface has engaged an edge of the mounting aperture is at least 20 pounds.

7. A generally U-shaped fastener according to claim 1 wherein the generally U-shaped fastener is formed from a sheet of material.

8. The fastener according to claim 1, further comprising:
    a sealing member generally surrounding at least a portion of said fastener body, said sealing member operable to engage at least one of the object and the panel.

9. A fastener that is adapted to be inserted into an aperture in a panel when securing the fastener to the panel, the fastener comprising:
    a body portion with a pair of side members and a flange that is adapted to extend about at least a portion of the aperture when the fastener is secured to the panel, the flange including a first flange portion and a second flange portion that are spaced apart from one another such that a slot is forward between the side members;
    a plurality of finger members coupled to the body, each finger member extending into the slot and downwardly toward an insertion end of the fastener;
    at least one abutting flange extending outwardly from each of the side members, each abutting flange having a first portion, a second portion and a third portion, the first portion coupling the abutting flange to an associated one of the side members, the second portion coupling a distal end of the first portion with a proximal end of the third portion, the third portion having an engaging portion with an exterior concave surface;
    wherein the fingers members associated with a first one of the side members extend toward a first lateral side of the fastener and the finger members associated with a second one of the side members extend toward a second lateral side of the fastener opposite the first lateral side and wherein the engaging portion of each abutting member is disposed adjacent to at least one finger member and extends toward an opposite lateral side of the fastener relative to the lateral side to which the at least one adjacent finger member extends.

10. The fastener of claim 9, wherein a thickness of the third portion is uniform over a length of the third portion and wherein the thickness of the third portion is equal to a thickness of the first portion.

11. The fastener of claim 10, wherein the exterior concave surface of the engaging portion extends from the second portion to a distal end of the third portion.

12. The fastener of claim 9, wherein each abutting flange is disposed between two of the finger members.

13. The fastener of claim 9, wherein the exterior engagement surface of the third portion of the abutting flange abuts and is substantially continuous with an exterior surface of the second portion of the abutting flange.

14. The fastener of claim 13, wherein the exterior surface of the second portion is convex in shape.

15. The fastener of claim 9, wherein a radius of curvature of the exterior concave surface is at least about 3.5 mm.

16. The fastener of claim 15, wherein a center of the radius is spaced apart from a top surface of the flange in a direction toward an insertion end of the fastener by a dimension that is greater than or equal to about 2 mm.

17. The fastener of claim 16, wherein the dimension is less than or equal to about 4 mm.

18. The fastener of claim 9, further comprising a sealing member coupled to the flange.

19. The fastener of claim 9, wherein the first portion is generally straight.

* * * * *